Figure 1:
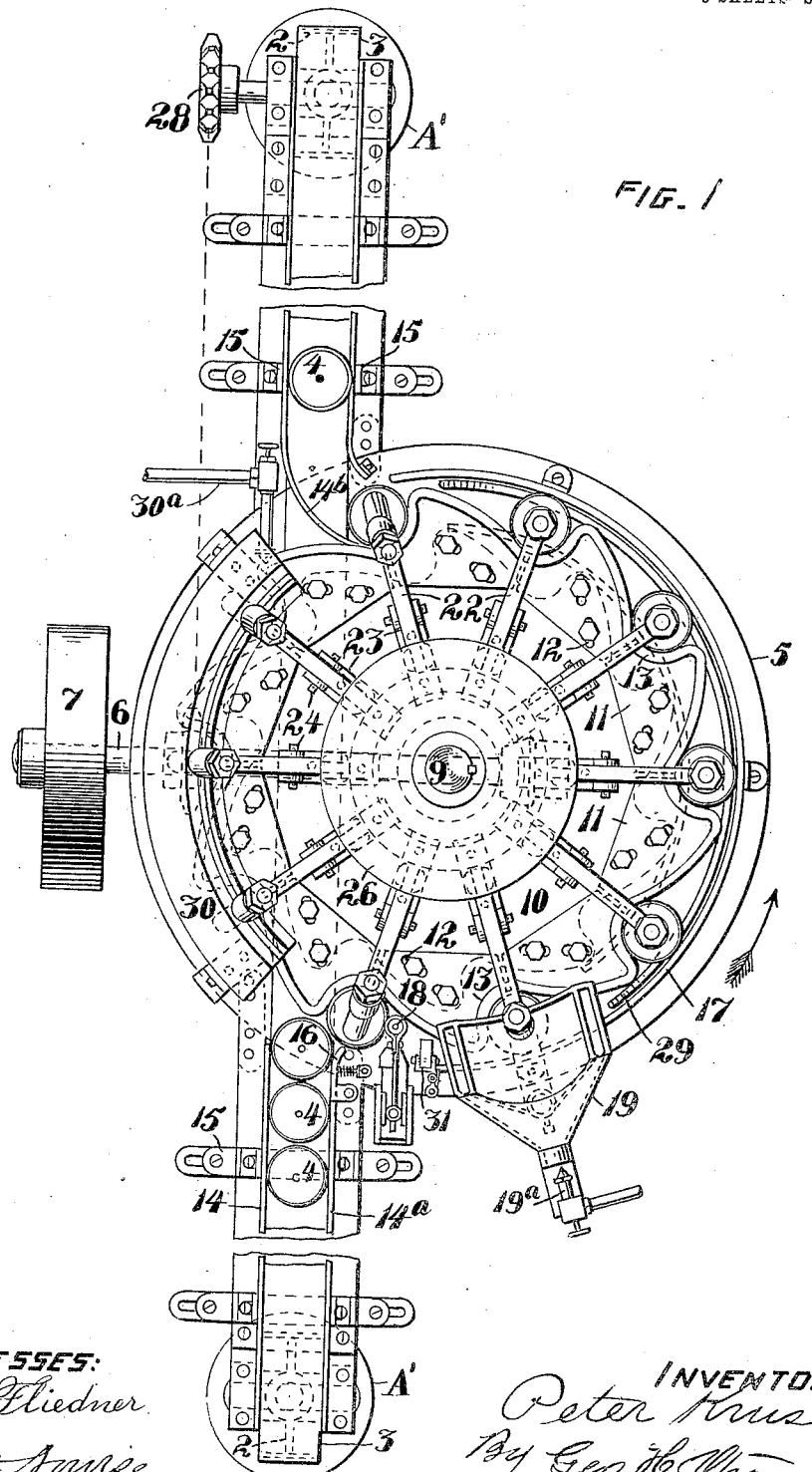

No. 832,327. PATENTED OCT. 2, 1906.
P. KRUSE.
CAN VENT SOLDERING MACHINE.
APPLICATION FILED MAY 23, 1904. RENEWED JULY 21, 1906.

3 SHEETS—SHEET 1.

WITNESSES:
F. C. Fliedner
J. F. Kruse

INVENTOR:
Peter Kruse
By Geo. H. Strong
Atty

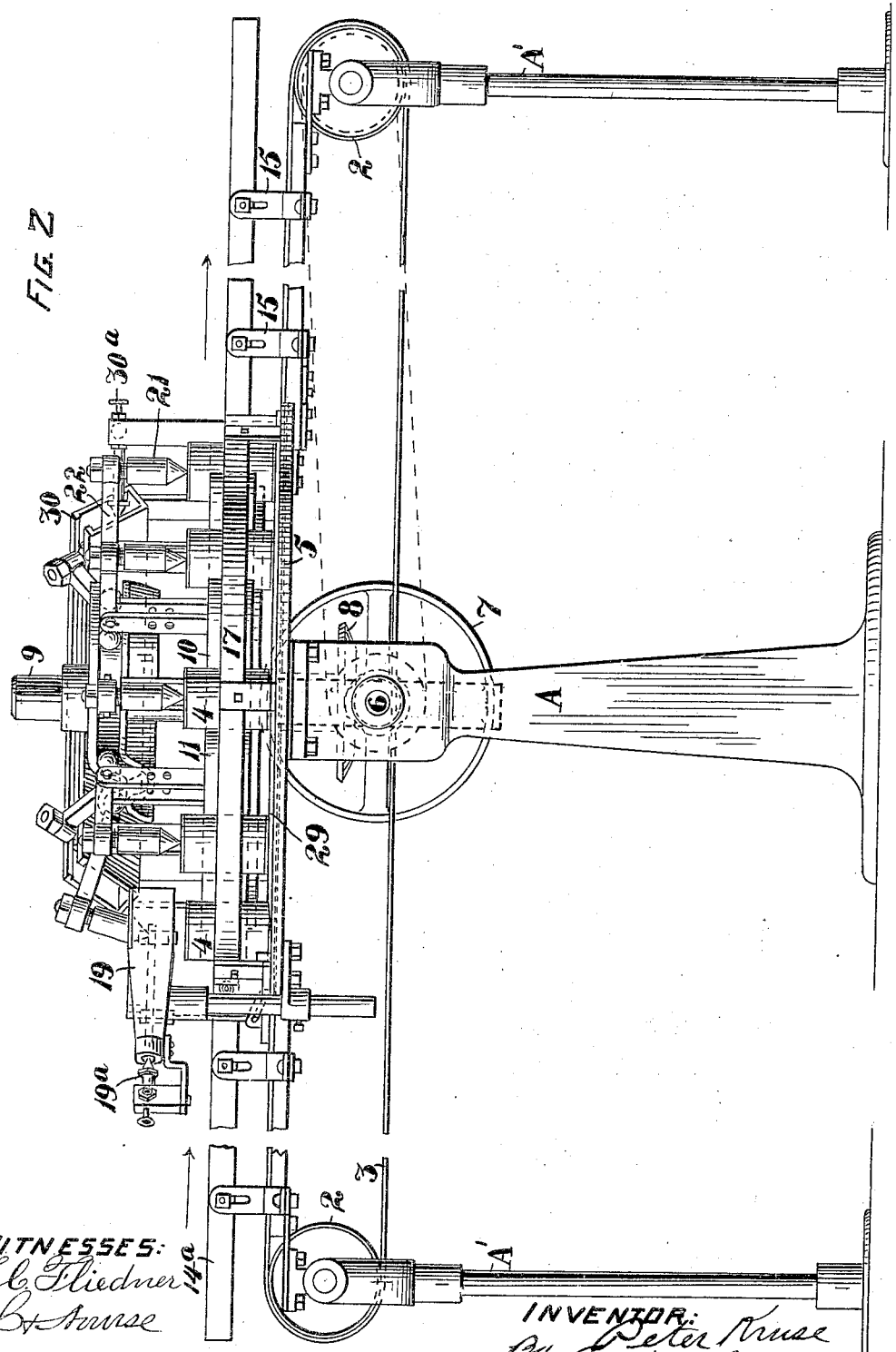

No. 832,327. PATENTED OCT. 2, 1906.
P. KRUSE.
CAN VENT SOLDERING MACHINE.
APPLICATION FILED MAY 23, 1904. RENEWED JULY 21, 1906.
3 SHEETS—SHEET 3.
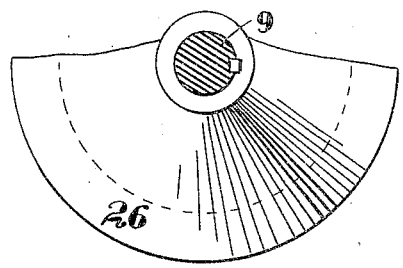
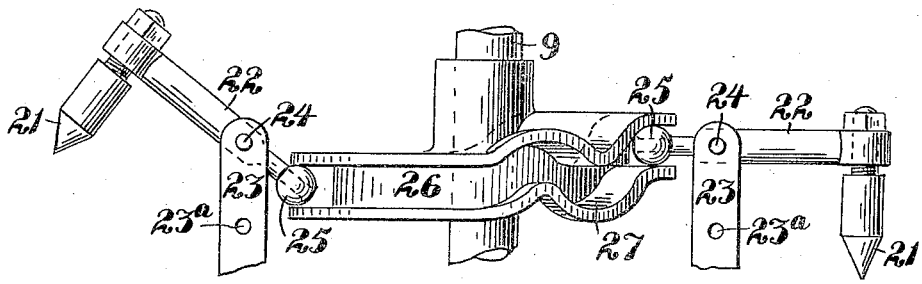
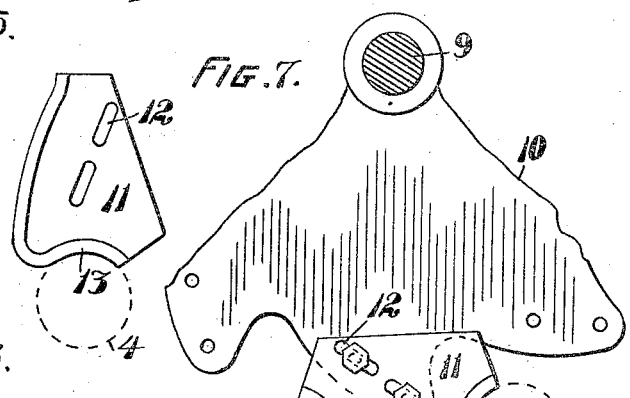
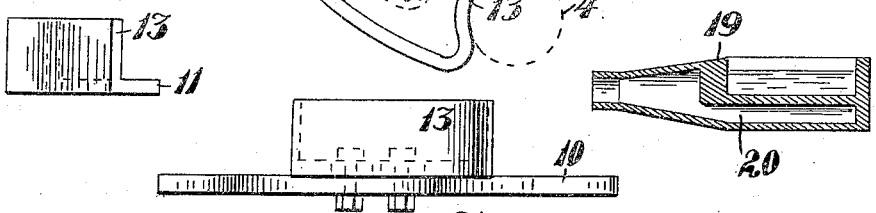
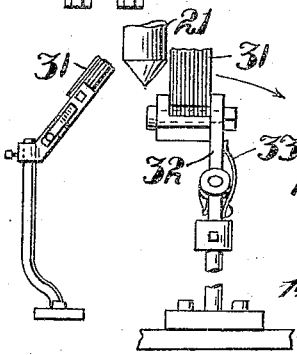
WITNESSES:
F. C. Fliedner
INVENTOR:
Peter Kruse
By Geo. H. Strong
Atty.

UNITED STATES PATENT OFFICE.

PETER KRUSE, OF ASTORIA, OREGON, ASSIGNOR OF ONE-THIRD TO ASTORIA IRON WORKS, OF ASTORIA, OREGON, A CORPORATION OF OREGON.

CAN-VENT-SOLDERING MACHINE.

No. 832,327.     Specification of Letters Patent.     Patented Oct. 2, 1906.

Application filed May 23, 1904. Renewed July 21, 1906. Serial No. 327,213.

*To all whom it may concern:*

Be it known that I, PETER KRUSE, a citizen of the United States, residing at Astoria, in the county of Clatsop and State of Oregon, have invented new and useful Improvements in Can-Vent-Soldering Machines, of which the following is a specification.

My invention relates to a machine which is designed to solder the vent-openings in the heads of cans, and it may also be employed for unsoldering such openings when, after a certain amount of cooking, impurities have collected in the cans which it is desired to discharge by means of the interior pressure generated within the cans.

The present machine is designed to mechanically and thoroughly perform the several operations here indicated or implied—viz., the wiping of the can cap or head previously to soldering, the deposit of the flux and solder in the required amounts and at the proper place, the heating and cleaning of the soldering-tool, and adequate fusing to stop off the hole in the cap or head either as a temporary or final step, and hermetically sealing the can. In the discharge of these functions the machine is properly a "vent-hole-soldering" or "stop-off" machine, which it is ordinarily called, and at the same time it is peculiarly adapted to unstop the can after the first cooking of its contents, so as to free them of impurities, as before stated.

Referring to the accompanying drawings, Figure 1 is a plan view of my apparatus. Fig. 2 is an elevation. Fig. 3 is a partial plan of the can by which the closing implement is actuated. Fig. 4 is a side elevation of the same. Figs. 5, 6, 7, 8, and 9 are views of cam-pocket plates. Figs. 10 and 11 are elevations taken at right angles with each other, showing the wiper for cleaning the soldering-iron. Fig. 12 is a sectional view of the solder-pot.

The machine comprises a suitable supporting frame or standard A, and I have here shown two other standards A' sufficiently separated to carry the pulleys 2, about which an endless traveling belt 3 is movable and upon which belt the cans 4 are placed and from which they are delivered to the entering end of the machine. The belt extends beyond the machine, and that end serves to receive and discharge the cans after they have passed through the machine.

The operative parts of the apparatus are carried upon a disk 5, which is shown as supported upon the central standard A; but it will be understood that any other suitable form of bed or support may be substituted for standards A and A' herein shown. The upper surface of this disk 5 may be channeled at one side of the center and in the line of travel of the belt 3, so that while the belt passes through the channel and across the disk the surface of the belt will be in such position that the cans standing thereon on end and with the vent-openings upward may be delivered from the belt upon the disk or a suitable track carried thereby and moved around the disk while the sealing operation takes place, as will be presently described.

Power may be applied to this apparatus through a horizontal shaft 6, extending beneath the disk 5 and having a pulley or other equivalent means for applying a rotative motion, as shown at 7. A vertical shaft 9 is fixed in standard A, and the revoluble carrier table or spider 10 has a bevel-gear 8 fixed to it, so as to be driven by a bevel-pinion fixed to the power-shaft 6.

The spider 10 has its periphery irregularly formed and adapted to receive plates 11, which are fixed thereto by means of bolts passing through slotted openings 12, which openings enable the operator to adjust the pocket-plates, as may be required. The plates have vertical flanges 13, and they may be made of any desired curvature, so as to fit different sizes of cans. Thus by the use of these pocket-plates it will be seen that any sized cans may be operated upon by this machine by simply adjusting or replacing these pocket-plates.

Upon each side of the carrying-belt are guideways 14, and these are supported upon slotted brackets, as at 15, adjustable both horizontally and vertically, the first adjustment serving to move the guideways to receive cans of larger or smaller diameter, and the vertical adjustments in like manner raise or lower the guideways for longer or shorter cans. At the point where the guideways approach the revolving spider there is a hinged spring-pressed gate 16, forming a continuation of the inner guideway and adapted to yield as each can passes it and enters one of the pockets, so as to be received by the vertically-curved flange 13, and as the spider is constantly revolving in a horizontal plane it successively removes the cans from the carrying-belt and transports them around the periphery of the disk.

The cans are maintained in their position during their travel around the disk by a circular guideway 17, against which the exterior of the cans travels, while the interior portion fits within the pockets, as previously described. As each can commences its travel around the circle the top of the can and vent-opening pass beneath one or more wipers or cleansing devices. In the present case I have shown a single device of this sort at 18, and this device may carry any soft, porous, or flexible material which is not only capable of sufficiently brushing and cleansing the vent-opening, but it also applies an acid to the opening, so as to prepare it for the reception of the solder.

The solder may be applied either in the form of a wire and fed to the point of use by suitable mechanical means, or it may be contained within a solder-pot 19 and maintained in a melted condition by a jet or burner 19ª, the heat from which passes through a chamber 20 beneath the solder-pot and thence escapes up the sides of the pot, thus maintaining the solder always in a molten condition. This pot is supported, as plainly shown in Fig. 2, in line above the traveling cans and in such a position that the soldering or sealing irons or implements 21 may be first dipped into the solder, then raised out of it, and applied to the vents of the cans as they pass beyond the solder-pot. These solder irons or implements 21 may be made in any suitable or well-known manner and are here shown as supported upon arms 22, which are fulcrumed in standards at 23. The inner ends of the arms project beyond the fulcrum-points 24 and carry ball or other suitable ends 25.

26 represents a fixed annular channel suitably supported upon the post 9 and having its upper and lower flanges separated at such a distance that the ends 25 of the soldering implement may travel freely in these channels. At certain points these channels are curved into a cam form, as shown at 27, and the upward and downward curvatures of these cams will act as follows: The implements 21 being supported by the standards 23 and traveling in unison with the spider and the cans carried thereby will always stand in vertical line above the vent-openings of the cans. The shape of the cam is such that the implement will be raised sufficiently to pass the edge of the solder-pot. Then the curvature of the cam will by its action upon the stem or handle depress the iron into the solder-pot, so that it will take up a portion of the solder. Then it will be raised so as to pass over the rim or periphery of the solder-pot, and the next curvature of the cam will depress the iron and bring it into contact with the vent-opening, which, having been cleansed and prepared with acid, as previously described, will then be in condition to receive the solder and be closed. It will be seen that the soldering implement and the cans travel to a considerable distance after leaving the soldering-pot, and the implement remaining in contact with the vent insures the thorough closing thereof before the cans reach the point of discharge. At any desired point before the discharge is reached the cam-grooves 27 act to again raise the soldering implements, thus leaving the cans free, and when they reach the point of discharge the cans are received by curved guides 14ᵇ, and these guides transfer them from the pockets of the spider upon the traveling belt 3, where it emerges after crossing the disk, and the cans are then delivered at the opposite end of the machine from their point of reception.

The traveling belt is moved by a sprocket 28, fixed upon the end of the shaft which carries one of the drums 2, and a chain connecting this sprocket with a similar sprocket upon the main shaft 6 serves to transmit motion.

It will be understood that the soldering-irons may be depressed upon the cans, or the cans may be raised into contact with the soldering-irons, or both operations may be effected. I have here shown a track 29, extending in the line of travel of the cans from the point where they are to be brought into contact with the soldering implement, and this track is beveled so as to rise from the surface of the disk 5 upon which the cans are being carried, thus raising the cans slightly and retaining them in this raised position while in contact with the soldering implement. The employment of these tracks also reduces the frictional resistance encountered in moving the can over a flat surface.

In order to maintain the soldering implement at a proper temperature, I have shown a closed segmental chamber 30, which extends a sufficient distance around the periphery of the apparatus and is open at the ends and also inclined at such an angle that when the cams 27 have raised the soldering implements after they have completed their task they will thereafter be carried in such a plane that they will enter the chamber 30, which also has an open slot at the top, so that the shanks of the irons can pass through this slot. Within the chamber may be fixed burners or any suitable form of heater 30ª, so that the temperature of the implements may be raised to any desired degree. After leaving the chamber it is desirable that the ends of the implements be cleansed so that they properly perform their work. For this purpose I have shown wipers 31, which may be made of any suitable flexible porous or absorbent material and are supported in such position that as the implements approach they will contact with these wipers and be cleansed, and, if desired, acid or a flux may also be applied to the irons. As shown in Figs. 10 and 11, these wipers are supported upon hinged arms 32, and these arms and the wipers are maintained in a normal position in readiness for the contact of the implement by springs 33, which springs yield to allow the implement to pass and immediately return the wiper to its normal position.

The cam plate or disk 26 is secured to the vertical shaft 9 by key, set-screw, or other device, so that it may be raised or depressed, and the standards 23, upon which the soldering implements are carried, may be provided with holes or otherwise constructed so that the implements can correspondingly be raised or depressed to suit different heights of cans upon which they are to operate.

In another application for a patent of even date herewith and for a similar purpose I have described and claimed mechanism by which wire solder may be suitably delivered to be applied to the vents by the heated implements, and the same or similar mechanism may also be used in the present apparatus, as shown in Figs. 3 and 4, without departing from the essential features and character of my machine.

Having thus described my invention, what I claim, and desire to secure by Letters Patent, is—

1. A can-vent-closing machine comprising a table, means for placing cans thereon with the vent ends upward, a revoluble spider above the table and having adjustably-secured plates formed with pockets for advancing the cans upon the table, and means for automatically applying a fluid sealing substance to said vents.

2. A can-vent-sealing machine comprising a table, means for placing cans thereon with the vent ends upward, a revoluble spider above the table and having adjustably-secured plates formed with pockets for advancing the cans upon the table, means for automatically applying a sealing substance to the vents, said means consisting of sealing implements movable in unison with the cans, and means for intermittently depressing said implements into contact with the can-vents.

3. A can-vent-sealing machine comprising a table, means for placing cans thereon with the vent ends upward, a revoluble spider above the table and having adjustably-secured plates formed with pockets for advancing the cans, sealing implements suspended above the line of travel of the cans and advancing in unison therewith, means for raising said implements and depressing them into contact with the can-vents, and means for supplying a sealing substance to be applied by said implements.

4. A can-vent-sealing machine comprising a table, means for placing cans thereon with the vent ends upward, a revoluble spider above the table said spider having adjustable pocket-plates attached to its periphery for advancing the cans, sealing implements suspended above the line of travel of the cans and advancing in unison therewith, means for depressing and maintaining said implements in contact with the can-vents during a portion of their advance, and means for supplying a sealing substance to be applied by said implements.

5. A can-vent-closing machine comprising a table, means for placing cans thereon with the vent ends upward, a revoluble spider above the table and having removably-secured plates provided with pockets, for advancing the cans, sealing implements suspended and movable above the line of travel of the cans, means for depressing and maintaining the implements in contact with the can-vents during a portion of their advance, and means for raising and heating said implements during another portion of their advance.

6. A can-vent-closing machine comprising a horizontal table, a belt movable toward the table, a spider revoluble above the table, plates adjustably secured around the periphery of the spider and provided with pockets said pockets adapted to receive the cans from the belt and transmit them around the table, sealing implements suspended above, and movable in unison with the cans, means for depressing said implements to contact with the can-vents, during a part of their travel, and means for supplying a sealing substance at the junction of the implements and can-vents.

7. In a can-vent-closing machine a horizontal table, a belt movable toward the table, a spider revoluble above the table, said spider having plates adjustably secured thereto and pockets formed in the plates adapted to receive the cans, sealing implements suspended above and movable in unison with the cans, and means for depressing said implements into contact with the can-vents during their advance.

8. In a vent-sealing machine, a horizontal table, raised tracks around a portion of the periphery of said table, means for delivering cans upon the table, a spider revoluble above the table having pockets into which the cans are received and by which they are transmitted and moved upon the tracks, sealing implements suspended above the path of travel of the cans and movable in unison therewith, means for actuating said implements to meet the can-vents when the cans are traveling upon the tracks, and means for supplying a sealing medium whereby the vents are closed.

9. In a vent-sealing machine, a horizontal table, an endless traveling belt passing across and in the plane of the table at one side of the center and adapted to transmit cans with the vent ends upward, a horizontal revoluble spider having pockets adapted to receive cans from the approaching belt, guides by which the position of the cans upon the belt is maintained, and a spring-pressed gate located upon one side, said gate being adapted to yield to allow cans to be successively engaged by the pockets of the spider.

10. In a machine for sealing can-vents, a horizontal circular table, a belt traveling across one side of said table substantially in the plane thereof, adjustable guards upon each side of said belt, a spring-pressed gate forming a continuation of one of the guards contiguous to the table, a spider horizontally revoluble above the table, plates adjustably secured to the spider and having pockets to receive the cans and transmit them around the table, means for sealing the can-vents during a portion of their travel around the table, curved guards located at the exit end portion of the traveling belt whereby the cans are transmitted from the table to the belt.

11. In a machine for sealing can-vents, a circular table, a spider revoluble in a plane above the table, said spider having plates removably secured around its periphery and provided with pockets for receiving the cans, means for delivering cans to said spider with the vent ends upward, sealing implements suspended above the path of travel of the cans and revoluble in unison therewith and a cam groove or channel with which said implements engage whereby they are depressed into contact with the can-vents and raised therefrom.

12. In a machine for sealing can-vents, a circular table, a spider revoluble concentrically about the table and having plates adjustably secured around its periphery and provided with pockets into which the cans are received, means for delivering cans successively to said pockets, fixed cam-grooves concentric with the spider and table, arms fulcrumed upon standards movable in unison with the spider and having the inner end engaging the cam-groove, sealing implements carried upon the outer ends of said levers and depressed by the movements of said levers through the cam-grooves into contact with the can-vent openings, and means for supplying a sealing substance to be applied to the openings by said implements.

13. In a machine for sealing can-vents, a horizontal table, a spider revoluble concentrically above said table said spider having plates adjustably secured around its periphery and provided with pockets, means for delivering cans to the pockets of said spider, sealing implements suspended above the path of travel of the cans movable in unison therewith, an interior cam with which the suspending-arms of the implements engage and by which they are raised or depressed during their travel, a heating-chamber through which the implements pass while elevated, a wiping device over which the implements pass after leaving the heating-chamber and means by which a sealing substance is subsequently applied when said implements are depressed into contact with the can-vents.

14. In a machine for sealing can-vents, a horizontal circular table, a spider, means for revolving it concentrically above the table, pockets adjustably fixed to said spider and adapted to receive cans of varying diameter, sealing implements suspended above the path of travel of the cans, means for adjusting said implements to suit cans of different heights, a cam whereby the implements are depressed into contact with the can-vents, and means for adjusting said cam in unison with the adjustments of the sealing implements.

15. In a machine for sealing can-vents, a table, means for placing cans thereon with the vent ends upward, means for advancing the cans upon the table, a container for a sealing medium located above the path of travel of the cans, sealing implements suspended and traveling above the cans, and mechanism by which said implements are depressed into the sealing medium, then raised, and again depressed into contact with the corresponding can-vent.

16. In a machine for sealing can-vents, mechanism by which the cans, and implements for sealing are caused to travel in unison, a container for a sealing medium located between the paths of travel of the cans and the implements, and cams by which the implements are first depressed into the sealing medium and afterward into contact with the can-vents.

17. In a machine for sealing can-vents, mechanism by which the cans and sealing implements are moved in horizontal superposed planes, a container for a sealing medium, means for melting said medium, and means for depressing the implements to successively dip into the molten sealing medium and into contact with the can-vents.

18. In a machine for sealing can-vents, mechanism by which the cans and the sealing implements are moved in horizontal superposed planes, a container for a sealing medium located between said planes, a burner and passages for conducting heat around the container, and mechanism by which the implements are successively depressed into the molten sealing medium and into contact with the can-vents.

In testimony whereof I have hereunto set my hand in presence of two subscribing witnesses.

PETER KRUSE.

Witnesses:
  S. H. NOURSE,
  JESSIE C. BRODIE.